United States Patent Office 2,914,575
Patented Nov. 24, 1959

2,914,575

METHOD FOR PREPARING PERCHLORO-ETHYLENE

Robert E. Feathers, New Martinsville, and Roy H. Rogerson, Moundsville, W. Va., assignors to Columbia-Southern Chemical Corporation, Allegheny County, Pa., a corporation of Delaware No Drawing. Application September 27, 1956
Serial No. 612,364

3 Claims. (Cl. 260—654)

This invention relates to catalytic conversion of symmetrical tetrachloroethane to other two carbon chlorinated compounds. It more particularly involves catalytic reaction of symmetrical tetrachloroethane with oxygen to prepare primarily perchloroethylene.

Symmetrical tetrachloroethane and oxygen may be catalytically reacted to yield chlorinated two carbon compounds including trichloroethylene and perchloroethylene according to United States Letters Patent 2,342,100 granted February 22, 1944, to Oliver W. Cass. It has however been observed even when stoichiometrically appropriate proportions of tetrachloroethane and oxygen are reacted in this manner that yields of perchloroethylene are well below theoretical. It further has been noted that yields of perchloroethylene also sharply decline with continued use of catalyst. Thus, both limited conversion to perchloroethylene and short effective catalyst life is observed following the teachings of the prior art.

It has been discovered that by recourse to special catalytic conditions and notably a particular catalyst the shortcomings of prior practices can be obviated or minimized greatly. Thus, increased yields of perchloroethylene and prolonged effective catalyst life are realized hereby.

In accordance with the present invention, symmetrical tetrachloroethane and oxygen are reacted in the presence of a cupric chloride-zinc chloride catalyst. With this cupric chloride-zinc chloride catalyst, exceptionally high yields of perchloroethylene are realized. Even after continued use and with some decline in catalyst activity, the perchloroethylene productivity is maintained at an effective, high level. This catalyst promotes the reaction of symmetrical tetrachloroethane and oxygen and production of perchloroethylene for periods well in excess of those found suitable in conjunction with other heretofore suggested catalysts. The productivity of this catalyst, e.g. pounds of perchloroethylene produced per pound of catalyst before the catalyst loses its effective activity, is exceptionally high.

The cupric chloride-zinc chloride catalyst used herein is in the form of finely divided solid particles, notably small extruded pellets, of inert porous supporting material impregnated with or otherwise containing a mixture of the two chlorides. Small extruded catalyst pellets are especially suitable although finely divided flakes and other configurations are acceptable. A typical particle size for the catalyst pellets is $3/16''$ diameter x $1/4''$ long. Inert porous supporting materials include among other alumina, alumina gels, silica, silica gels, calcium silicate, diatomaceous earths, infusorial earth, pumice and kieselguhr.

The cupric chloride-zinc chloride composition of the catalyst is such that the two salts constitute 5 to 45 percent by weight, more preferably 20 to 30 percent by weight, of the catalyst composition. The cupric chloride should be the predominant chloride salt for best results. Thus, more than one mole of cupric chloride per mole of zinc chloride should be present. A typical preferred mole ratio is from 2 to 3.5 moles of cupric chloride per mole of zinc chloride.

In a typical performance of the present invention, symmetrical tetrachloroethane and oxygen are passed through a tubular reactor filled with the cupric chloride-zinc chloride impregnated inert porous supporting material at a rate such that the contact time in the zone is less than 25 seconds, usually between 3 and 20 seconds. The maximum temperature established in the reactor is 570° F. to 930° F., preferably 680° F. to 800° F., for effective utilization of this catalyst. Further observed is a tendency for a hot spot to develop in the catalyst bed. Under normal operating conditions, it is this hot spot temperature which is maintained within the temperature range above defined.

This hot spot temperature is usually the maximum temperature in the catalyst bed. Temperatures of the jacket surrounding the reactor are somewhat cooler, e.g. usually at a temperature 30° F. to 70° F. cooler than the hot spot temperature. Aside from the hot spot, the bed is a temperature approximating that of the jacket.

Symmetrical tetrachloroethane may be vaporized prior to introduction into the reactor by a separate vaporization step or it can preferably be vaporized in a preheating zone of the reactor. Usually, the preheating zone is packed with porcelain Raschig rings or like packing. One preferred expedient involves preheating in a zone packed with spent catalyst. Spent catalyst refers to catalyst, the activity of which has declined to a point where its continued use for promoting the reaction between tetrachloroethane and oxygen is no longer practical. When catalyst's activity has declined to the extent that less than about 50 mole percent of the reaction products is perchloroethylene, the catalyst is regarded as spent for the purposes of operating the reaction most appropriately.

If desired, preheating of tetrachloroethane in contact with spent catalyst may be achieved by progressively correlating the rate of catalyst deactivation with a rate of movement of the catalyst bed in the direction of countercurrent to the feed.

Symmetrical tetrachloroethane and oxygen are fed in the ratio of 0.5 mole of oxygen per mole of symmetrical tetrachloroethane, the stoichiometric mole ratio required for conversion of symmetrical tetrachloroethane to perchloroethylene. This ratio is susceptible of some variation. Between 0.4 and 0.6 moles of oxygen per mole of symmetrical tetrachloroethane can be fed.

Oxygen in relatively pure state should be used although diluted oxygen such as air is operative. Somewhat lower conversions and yields have been experienced with the use of air. Increased burning is encountered with air; as a consequence a portion of the carbon fed as symmetrical tetrachloroethane leaves the reactor as carbon monoxide or carbon dioxide. On the other hand, following the concepts of the present invention and utilizing pure oxygen burning is quite low, rarely exceeding 2 percent by weight of the symmetrical tetrachloroethane.

The following example describes the manner in which suitable catalyst may be prepared:

*Example I*

A cupric chloride-zinc chloride catalyst composition was prepared by dissolving 444 grams (2.6 moles) of $CuCl_2.2H_2O$ and 140 grams (1.03 moles) of $ZnCl_2$ in 350 milliliters of water. A liter of pelletized diatomaceous silica sold under the trade name "Celite" was then added. The pellets were $3/16''$ diameter by $1/4''$ long. Drying of the catalyst was achieved by evaporating most of the water from the mixture while mixing and then heating the catalyst in thin layers on trays to remove the remaining water.

The following example illustrates the manner in which the present invention may be performed:

Example II

A jacketed reactor comprised of a vertical one inch diameter nickel tube was filled with 240 grams of catalyst prepared according to Example I. This provided a catalyst bed 24 inches high. At the top of the reactor and above the catalyst, the tube was filled with porcelain rings. A heating medium, "Hi-Tec" salt, was circulated during operation.

Liquid symmetrical tetrachloroethane was fed at the rate of 2 grams per minute to the top section of the reactor filled with porcelain rings where it was vaporized, preheated and mixed with substantially pure oxygen. Oxygen was fed at the rate of 0.5 moles per mole of tetrachloroethane fed.

The admixed vapors of oxygen and tetrachloroethane then passed through the catalyst bed. A jacket temperature of 740° F. was maintained and the hot spot in the catalyst bed was 800° F. for the first 60 hours of operation and was 775° F. to 785° F. for the remainder of the run.

Exit gases from the bottom of the reactor were partially condensed in a flask, with the uncondensed gases passed into cold traps refrigerated in a dry ice-acetone freezing mixture. A water scrubber removed hydrogen chloride. The organic condensate was analyzed periodically and the product distribution determined throughout 1500 hours of operation with the same catalyst charge.

Table 1 lists the product distribution at various stages of catalyst aging during the run:

| Elapsed Hours of Operation | Mole Percent | | |
|---|---|---|---|
| | $C_2HCl_3$ | $C_2HCl_5$ | $C_2Cl_4$ |
| 100 | 18 | 0 | 77 |
| 200 | 17 | 2 | 76 |
| 300 | 18 | 2 | 75 |
| 400 | 17 | 4 | 73 |
| 500 | 20 | 5 | 69 |
| 600 | 21 | 10 | 63 |
| 700 | 23 | 16 | 56 |
| 800 | 23 | 16 | 57 |
| 900 | 25 | 17 | 54 |
| 900–1,500 | 24 | 18 | 53 |

By comparison with results observed with the use of other catalysts for this reaction, the present catalyst provides products which contain 77 mole percent perchloroethylene for substantial periods of operation. Even higher mole percent concentrations on the order of 85 to 90 mole percent of perchloroethylene are realized with somewhat less than theoretical conversion, e.g. 70 to 85 percent conversion. This is in contrast to other catalysts which provide product compositions containing a maximum of about 50 to 55 mole percent perchloroethylene. As Example II illustrates, this catalyst provides high perchloroethylene yields for at least 400 or 500 hours. Thereafter, as its activity gradually declines, it still functions to provide products containing 53 mole percent perchloroethylene. Even when the catalyst is only capable of giving the lower perchloroethylene concentrations in the reaction products, it is functioning with at least comparable effectiveness of other tested catalysts. Also, the catalyst maintains a practical degree of activity for at least 1500 hours. This is a period of activity considerably greater than that of other tested catalysts.

Besides perchloroethylene, trichloroethylene and pentachloroethane are produced in varying quantities. It has been observed during the first several hundred hours of catalyst use that the amount of pentachloroethane in the reaction products is exceptionally low. As the catalyst gradually declines in activity to a level at which it is operated for several hundred hours, the concentration of pentachloroethane increases to an essentially constant value of about 18 mole percent by weight of the reaction product. Trichloroethylene usually ranges between 15 and 25 mole percent by weight of the reaction product. Recovery of purified perchloroethylene, pentachloroethane or trichloroethylene from the reaction mixture may be accomplished by fractional distillation.

The process is usually performed such that essentially complete consumption of tetrachloroethane occurs, e.g. little, if any, tetrachloroethane passes through the reactor unchanged. Operation to obtain lower tetrachloroethane conversions is also possible. Usually between 95 and 97 percent of this converted tetrachloroethane is accounted for as perchloroethylene, trichloroethylene and pentachloroethane. Only slight burning to carbon monoxide and carbon dioxide is encountered. Also, a minor amount of hexachloroethane is often found in the crude reaction products.

Although the present invention has been described with reference to specific details of certain embodiments, it is not intended that the invention be construed as being limited thereto, except insofar as such details are found in the accompanying claims:

What is claimed is:

1. A process which comprises reacting oxygen and symmetrical tetrachloroethane at a temperature from 570° F. to 930° F. in the presence of a catalyst comprised of an inert porous carrier impregnated with cupric chloride and zinc chloride said chlorides representing between 5 to 45 percent by weight of the catalyst whereby to obtain perchloroethylene.

2. The method of claim 1 wherein the catalyst composition contains a ratio of chloride salts of from 1 to 3.5 moles of cupric chloride per mole of zinc chloride.

3. A method for preparing perchloroethylene by reacting oxygen and symmetrical tetrachloroethane which comprises mixing from 0.4 to 0.6 mole of essentially pure oxygen per mole of tetrachloroethane, passing the mixture into contact with a catalyst composition comprising an inert porous carrier impregnated with cupric chloride and zinc chloride and containing from 5 to 45 percent of said chlorides by weight at a temperature from 570° F. to 930° F.

References Cited in the file of this patent

UNITED STATES PATENTS

| | | |
|---|---|---|
| 2,084,937 | Britton et al. | June 22, 1937 |
| 2,228,356 | Kipper | Jan. 14, 1941 |
| 2,243,191 | Cantzler et al. | May 27, 1941 |
| 2,342,100 | Cass | Feb. 22, 1944 |
| 2,636,864 | Pye et al. | Apr. 28, 1953 |
| 2,725,411 | Ladd et al. | Nov. 29, 1955 |